United States Patent Office 3,102,522
Patented Sept. 3, 1963

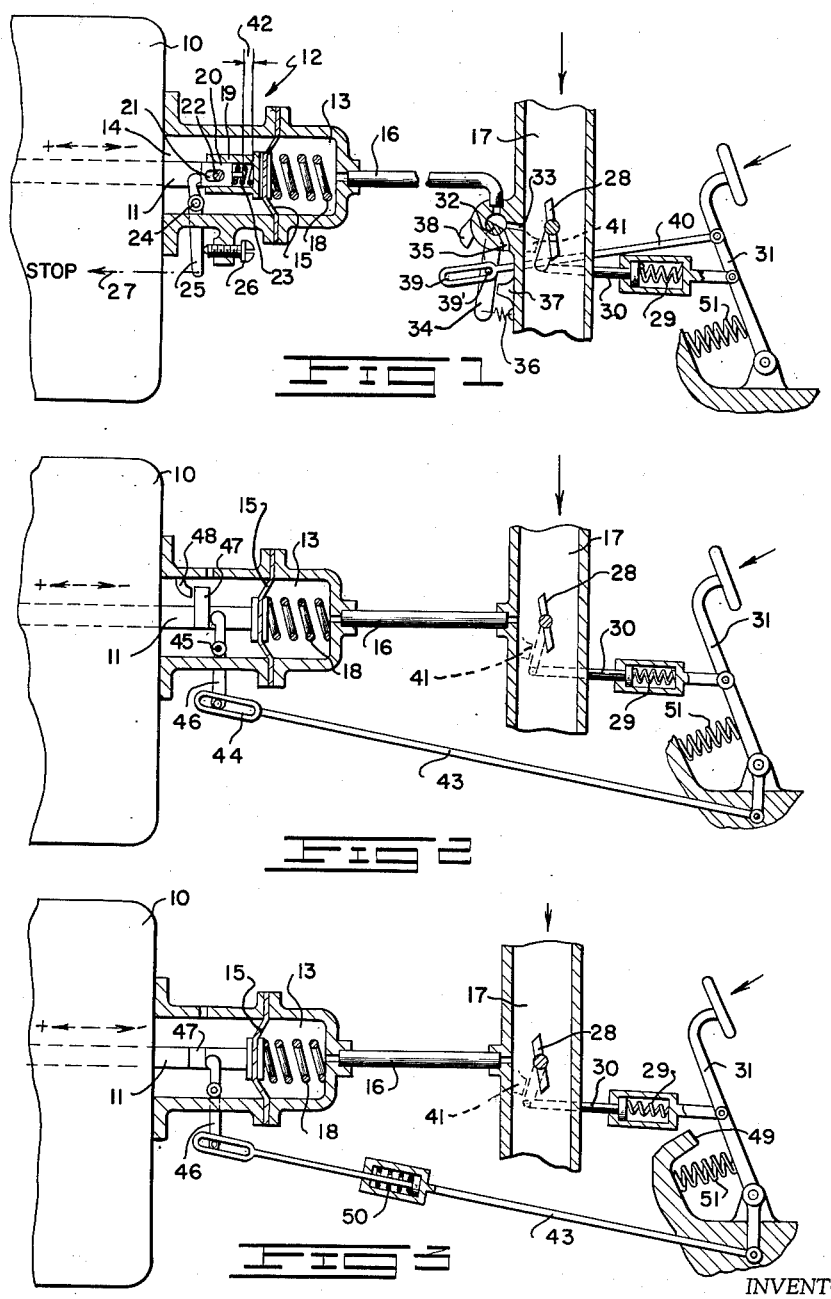

3,102,522
CONTROL ARRANGEMENT FOR INTERNAL COMBUSTION ENGINES
Friedrich K. H. Nallinger, Stuttgart, Germany, assignor to Daimler-Benz Aktiengesellschaft, Stuttgart-Unterturkheim, Germany
Filed Dec. 15, 1960, Ser. No. 76,068
Claims priority, application Germany Dec. 16, 1959
10 Claims. (Cl. 123—140)

The present invention relates to a control arrangement for internal combustion engines, and more particularly to a rotational speed control installation for fuel-injection-type internal combustion engines in motor vehicles which enables the driver of the vehicle to selectively overcome the existing speed limit means ordinarily provided with such engines to prevent exceeding a predetermined maximum rotational engine speed under normal driving conditions.

It is known in the prior art to limit the maximum engine rotational speed in fuel-injection-type internal combustion engines of vehicles by rotational speed control arrangements, for example, by means of rotational speed limit means which respond to the vacuum in the intake manifold. Such control installations affect favorably the fuel consumption and also the length of life and durability of the internal combustion engines.

However, particularly in the interest of a greater traffic safety, it is desirable to give to the driver the possibility to drive, in exceptional cases, for example, while passing, still somewhat faster than would correspond to the normal maximum engine rotational speed as determined by the engine rotational speed limit means.

Accordingly, it is proposed in accordance with the present invention to provide a rotational speed control or regulating arrangement for vehicle injection-type internal combustion engines provided with limit means for the maximum engine rotational speed in which, upon further movement of the gas pedal beyond a pressure point, a higher controlled or governed engine rotational speed is adjusted. Pressure points in the path of the gas pedal, such as kickdown installations are known per se in the prior art, however, only in connection with the shifting of change-speed transmissions.

The installation according to the present invention for the adjustment of the relatively higher controlled or governed engine rotational speed may be operative to adjust the limit control installation for the maximum engine rotational speed either to a higher value, or, however, to render the same inoperative altogether according to another modified embodiment in accordance with the present invention.

In installations provided with limit means for the maximum engine rotational speed by controlling or governing the injection quantity with the aid of the vacuum in the intake manifold which increases with an increasing rotational speed, the control installation for the rotational speed may be adjusted to a higher position according to the present invention by admitting atmospheric air into the vacuum system of the control installation.

The adjustment of the controlled or governed engine rotational speed to a higher value, however, may also be attained in accordance with another embodiment of the present invention by displacing or adjusting the control member of the injection pump, possibly with the aid of an auxiliary force, for which purpose may serve the pressure oil of the engine lubricating system, against the effect of the limit control installation for the maximum engine rotational speed, preferably by means of a resilient linkage or yielding connection. The resilient linkage or yielding connection is thereby effective as additional resistance for the limit control installation.

With some known control installations of the prior art, there is provided, during full-load, a slight reversal or throttling back movement of the injection control member, for example of the control rack of the injection pump with an increasing rotational speed in the normal operating rotational speed range of the engine. Such an arrangement is made to take into consideration and compensate for the characteristics of certain injection pumps which supply, with an increasing rotational speed, an increased quantity per stroke and for the decrease of the filling of the cylinders with combustion air caused by throttling losses. The present invention proposes in connection with such known installations that with a further movement of the gas pedal beyond the pressure point this reversal or throttling back movement of the control member is additionally eliminated, i.e., is nullified. As a result thereof, not only a higher rotational speed is available to the driver but also an increased torque whereby the fuel enrichment occurring during such operation which may have as possible consequence the production of a certain amount of smoke with Diesel engines can be accepted for short periods of time without any risk or danger.

Accordingly, it is an object of the present invention to provide a control installation for an injection-type internal combustion engine provided with control means for normally limiting the engine rotational speed which obviates the shortcomings and inadequacies of the prior art constructions.

It is another object of the present invention to provide a regulating device for injection-type internal combustion engines, especially for motor vehicles, provided with control means for limiting the maximum rotational speed of the engine under normal driving conditions which permits the driver to selectively render inoperative the maximum engine rotational speed limit means so as to make available a higher driving speed and possibly also a higher torque in exceptional cases, for example, while passing another vehicle.

Still a further object of the present invention resides in the provision of a control system rendering ineffectual the engine rotational speed limit means normally limiting the maximum speed of the engine which is simple in construction, readily adapted to be installed in existing vehicles and reliable in operation.

These and further objects, features, and advantages of the present invention will become more obvious from the following description when taken in connection with the accompanying drawing which shows, for purposes of illustration only, three embodiments in accordance with the present invention, and wherein FIGURE 1 is a partial, somewhat schematic cross-sectional view through a control installation in accordance with the present invention in which an adjustment to the higher engine rotational speed is obtained by the supply of atmospheric air to the vacuum-control system.

FIGURE 2 is a partial, somewhat schematic cross-sectional view of a modified embodiment of a control system in accordance with the present invention in which the normal rotational speed limit means is rendered in operative by mechanical means, and FIGURE 3 is a partial somewhat cross-sectional view through still another modified embodiment of a control installation in accordance with the present invention, similar to FIGURE 2, in which the normal rotational speed control means is adjusted to a higher engine control speed by the interposition of a further spring, for example in a yielding linkage.

Referring now to the drawing wherein like reference numerals are used throughout the various views to designate corresponding parts, and more particularly to FIG- URE 1, reference numeral 10 designates an internal combustion engine fuel injection pump of any suitable known construction which is provided with a control member, for instance, in the form of a control rack 11 or the like for changing the supplied fuel quantities by displacement thereof. The displacement or adjustment of the control rack 11 takes place by means of a regulating device generally designated by reference numeral 12. The regulating device 12 includes a vacuum chamber 13 and a chamber 14 which is subjected to atmospheric pressure, the chambers 13 and 14 being separated from one another by a diaphragm or membrane member 15. The vacuum chamber 13 is operatively connected or in communication through a line 16 with the intake manifold 17 of the engine. A spring 18 seeks to displace the membrane 15 in the direction of full load. A sleeve 19 is secured in any suitable manner to the membrane 15 and is also securely connected with the control rack 11 arranged offset with respect thereto. A sliding member 20 is adapted to move within the sleeve 19 within the limits conditioned by the elongated aperture 21. A bolt member 22 extends through the elongated aperture 21 which bolt member 22 is rigidly connected with the sleeve 19. A compression spring 23 seeks to adjust the sliding member 20 toward the left as view in FIGURE 1 of the drawing. A two-armed abutment lever 25 pivotally supported at 24 cooperates with the other end or face of the sliding member 20. The movement of the lever 25 is limited in the counterclockwise direction thereof by the full-load adjusting screw 26. The lever 25 is also adapted to be moved in the clockwise direction thereof by any suitable means such as a Bowden cable 27 representing the stoppage actuating means.

The throttle valve 28 is disposed within the intake manifold 17 of the internal combustion engine which valve 28 is operatively connected with the gas pedal 31 over a springy or yielding linkage 30 provided with a spring 29 adapted to be compressed. A compression spring 51 normally seeks to move the gas pedal into the idling or zero position thereof. The line 16 is connected permanently through a stop-cock or valve 32 of any suitable construction with a line 33 leading to the intake manifold 17. By pivoting or swinging the stop-cock or valve 32 in the clockwise direction with the aid of the lever 34 secured thereto, the line 16 may be additionally connected with a line 35 leading to the atmosphere. The lever 34 is normally pulled by a drawspring 36 against an abutment 37, however, the lever 34 can also be swung or pivoted in the clockwise direction until abutment thereof against the abutment or stop member 38, for example, provided at the valve housing. The actuation of the lever 34 takes place through a lost-motion connection 39, 39' provided in rod 40 which, in turn, is pivotally secured at the gas pedal 31. The lost motion connection 39, 39' is constituted, for example, by an elongated aperture 39 and a pin member 39' adapted to slide therewithin and secured to the lever 34.

The installation is illustrated in FIGURE 1 in the full load position thereof, slightly below the usual controlled or governed engine rotational speed, whereby the throttle valve 28 assumes the position thereof corresponding to the fully open position as determined by an abutment 41. A certain vacuum prevails now within line 16 and therewith within vacuum space 13 of the regulating device 12 which is just sufficient to resist or withstand the force or pressure exerted by spring 18. With an increase in the rotational speed of the engine, the vacuum also increases within the suction or intake manifold 17 and therewith also within the vacuum chamber 13 so that the membrane 15 and therewith also the control rack 11 move toward the right as viewed in FIGURE 1 against the force of the spring 18 and therewith control the internal combustion engine to limit the speed thereof.

According to the present invention, the driver has the possibility to effectively displace the control or governing action thus obtained into a range of higher rotational speeds. More particularly, if the driver steps on the gas pedal 31 and pushes the same, from the illustrated full-load position thereof against the spring 29 further in the downward direction, then he actually swings the lever 34 by means of link 40 and therewith operates the valve 32 in the clockwise direction whereby atmospheric air is permitted to enter the line 16 through line 35 and therewith atmospheric air is also admitted into the vacuum space 13. This atmospheric air acts in effect in the direction of the force of spring 18 so that control or governing of the engine takes place only when the vacuum present in the control system has attained again, as a result of a further rotational speed increase on the part of the engine, the value producing the previously described governing action notwithstanding the admission of atmospheric air.

The supply or admission of atmospheric air may be made so large by appropriate dimensioning of line 35 that the control by means of the vacuum within chamber 13 is eliminated practically completely and the spring 18 always presses the membrane 15 toward the left in the direction of full load also during the highest rotational speeds. In that case, the normal limit control installation for the maximum engine rotational speed would be rendered completely inoperative.

The spring 29 is so pretensioned by any appropriate means that the driver clearly senses the passing beyond the usual full-load position by having to overcome a certain pressure point.

The full-load position of the control rack 11 is determined by the adjusting screw 26 which determines the illustrated position of the lever 25. With smaller operational rotational speeds than the rotational speeds which are normally subjected to governing action by the control system, the control rack 11 could be adjusted somewhat further in the direction of full load since, on the one hand, with a decrease of the pump rotational speed while the control rack position remains the same, the supply quantity of the injection pump decreases somewhat per stroke and, on the other, with smaller engine rotational speeds, the filling of the cylinders with combustion air is somewhat better as a result of a decrease of the throttling losses. The control rack 11 in the embodiment of FIGURE 1 now has the possibility during smaller rotational speeds to displace itself toward the left as viewed in FIGURE 1 by a small amount indicated by distance 42 notwithstanding the rigid abutment in the form of the lever 25. This takes place as a result of the decrease of the vacuum in the chamber 13 and therewith as a result of the increased effectiveness of the spring 18 which may then compress the spring 23. The same effect, however, also occurs if the driver by overcoming the pressure point produced by the spring 29 permits air to enter the vacuum chamber through line 35 since, in that case, the spring 18 has to produce a smaller force to overcome the vacuum and therewith is able to compress the spring 23. Consequently, with the adjustment of a higher governed engine rotational speed, there is additionally obtained an adjustment for a somewhat larger quantity of fuel per pump stroke. This fuel quantity increases the torque, even though possibly by the simultaneous formation of smoke in the exhaust. However, for the relatively short periods of time during which the driver would press down completely the gas pedal 31, such smoke formation or production is not dangerous.

In the installation according to FIGURE 2, the driver, during step-down or kick-down of the gas pedal 31 beyond the pressure point determined by the spring 29, moves or displaces rod 43 provided with a lost motion connection 44 toward the right as viewed in FIGURE 2. In connection therewith, the driver may kick down the gas pedal 31 for such length of time until a two-armed lever 46 pivotally secured at 45 abuts against an abutment 47 secured on the control rack 11 and this abutment 47 abuts against a stationary abutment 48 of the housing which abutment 48, in turn, may possibly be adjustable in any suitalbe manner, for example, by a set screw or the like. The abutment 48 determines the full load position of the control rack 11. The normal vacuum control or regulation with the aid of the vacuum chamber 13 is therefore completely eliminated by the driver by completely mechanical means.

A similar kick-down installation is shown in FIGURE 3, differing only from that of FIGURE 2 by the fact that for the kick down position of the gas pedal 31 an abutment 49 cooperating therewith is provided and that the rod 43 is constructed yieldingly in itself by means of a spring 50 providing a yielding or resilient lost-motion connection. If the driver steps on the gas pedal against the resistance of spring 29 up to engagement thereof with abutment 49, then the driver also moves by means of lever 46 and abutment 47, the control rack 11 to the full load position thereof. Nonetheless, with a strongly increased rotational speed an automatic control may take place since then the vacuum in chamber 13 becomes so large that it overcomes both the force of spring 18 as well as of spring 50, and the control rack 11 is moved thereupon once more toward the right as viewed in FIGURE 3 by increasing the length of the springy or yielding rod 43.

While I have shown and described herein three embodiments in accordance with the present invention, it is understood that the same is not limited thereto but is susceptible of many changes and modifications within the spirit and scope thereof. For example, the present invention is not limited to a control installation governing the rotational speed of the engine with the aid of the vacuum prevailing in the intake manifold but may also be used with other control installation. Consequently, it is quite obvious that the present invention may be varied at will by a person skilled in the art without departing from the scope and spirit thereof and I, therefore, do not wish to be limited to the details shown and described herein, but intend to cover all such changes and modifications as are encompassed by the scope of the appended claims.

I claim:

1. A rotational speed control installation for an injection type internal combustion engine provided with injection pump means including a control member having an abutment member fixed thereto and with limit means for normally limiting the maximum engine rotational speed, comprising engine adjusting means operatively connected with said injection pump means to adjust the quantity of injected fuel, means effectively constituting a distinct point in the path of said engine adjusting means, and means operatively connected with said engine adjusting means providing a direct mechanical connection between said engine adjusting means and said abutment member to effectively enable selective adjustment upon movement of said engine adjusting means beyond said distinct point to a position thereof corresponding to a higher engine rotational speed than that normally governed by said limit means, said means operatively connected with said engine adjusting means comprising a linkage connection extending from said engine adjusting means to said abutment member, said linkage connection including a link member selectively engageable with said abutment member for moving said control member in a direction such as to increase said quantity of injected fuel.

2. A rotational speed control installation for an injection-type internal combustion engine, especially for vehicles, provided with limit means for normally limiting the maximum engine rotational speed, said engine having an injection pump comprising a movable control member to vary the amount of injected fuel, said control member having an abutment member fixed thereto, a gas pedal operatively connected with said control member to selectively adjust the quantity of fuel injected into the engine, said limit means being normally operatively connected with said control member to limit the maximum engine rotational speed, means effectively constituting a pressure point in the path of said gas pedal, and means operatively connected with said control member providing a direct mechanical connection between said abutment member and said gas pedal to effectively enable selective adjustment of said control member to a position corresponding to a higher engine rotational speed than that governed by said limit means upon movement of said gas pedal beyond said pressure point, said direct mechanical connection comprising linkage means connected with said gas pedal and including a pivotally mounted member movable by said gas pedal into abutting relationship with said abutment member for moving said control member in a direction such as to increase the supply of injected fuel.

3. A rotational speed control installation for a vehicle injection-type internal combustion engine having an injection pump including a control member for adjusting the amount of injected fuel, comprising a gas pedal operatively connected with said control member for selectively adjusting the quantity of fuel injected into the engine, said control member having an abutment member fixed thereto, limit means operative on said control member for effectively limiting the maximum engine rotational speed under normal operating conditions, means constituting a pressure point in the path of said gas pedal, and means operatively connected with said control member providing a direct mechanical connection between said gas pedal and said abutment member to effectively enable selective adjustment of said control member upon movement of said gas pedal beyond said pressure point to a position of said control member corresponding to a higher engine rotational speed than that governed by said limit means, said direct mechanical connection comprising a pivotally mounted member disposed adjacent to said control member and movable into abutting engagement with said abutment member to move said control member to said position, and means for actuating said pivotally mounted member by said gas pedal comprising linkage means interconnecting said pivotally mounted member and said gas pedal, said linkage means comprising a rod member connected to said gas pedal and to said pivotally mounted member.

4. A rotational speed control installation for a vehicle injection-type internal combustion engine having an injection pump including a control member having an abutment member fixed thereto, comprising a gas pedal operatively connected with said control member to enable selective adjustment of the quantity of fuel injected into the engine, limit means operative on said control member for effectively limiting the maximum engine rotational speed under normal operating conditions, means constituting a pressure point in the path of said gas pedal, and means operatively connected with said control member providing a direct mechanical connection between said gas pedal and said abutment member to effectively enable selective adjustment of said control member upon movement of said gas pedal beyond said pressure point to a position of said control means corresponding to a higher engine rotational speed than that governed by said limit means including means for rendering said limit means ineffectual, said direct mechanical connection comprising linkage means connected to said gas pedal and including a link member selectively movable thereby into contact with said abutment member to thereby move said control member to said position.

5. A rotational speed control installation for a vehicle injection-type internal combustion engine having an injection pump including a control member having an abutment member fixed thereto, comprising a gas pedal operatively connected with said control member to enable selective adjustment of the quantity of fuel injected into the engine, limit means operative on said control member for effectively limiting the maximum engine rotational speed under normal operating conditions, means constituting a pressure point in the path of said gas pedal, and means associated with said control member providing a direct mechanical connection between said gas pedal and said abutment member to enable displacement of said control member against the effect thereon by said limit means upon movement of said gas pedal beyond said pressure point to provide selectively a higher engine rotational speed than that normally governed by said limit means, said direct mechanical connection comprising linkage means connected to said gas pedal for operation thereby, said linkage means including movable member engageable with said abutment member for moving said control member in a direction such as to increase the supply of injected fuel.

6. A rotational speed control installation according to claim 5, wherein said control member is a control rack.

7. A rotational speed control installation according to claim 5, wherein said linkage means includes yieldable means.

8. A rotational speed control arrangement for an injection-type internal combustion engine for vehicles provided with an intake means and with fuel injection means including a control member adapted to vary the quantity of fuel injection into the engine, comprising regulating means operatively connected with said control member for regulating the same in dependence on the vacuum prevailing in said intake means, abutment means to determine the full load position of said throttle valve means, a gas pedal, means effectively constituting a pressure point within the path of said gas pedal, yielding connection means connecting said gas pedal with said throttle valve means, and means operatively connected with said gas pedal means to effectively enable selective adjustment of said control member upon movement of said gas pedal beyond said pressure point to a position of said control means corresponding to a higher engine rotational speed than that normally governed by said regulating means, said means providing a direct mechanical connection comprising linkage means connected to said gas pedal, said linkage means comprising a pivotally mounted member adapted for abutting engagement with said abutment member to effect said selective adjustment of said control member upon said movement of said gas pedal beyond said pressure point.

9. A rotational speed control arrangement according to claim 8, wherein said linkage means includes rod means comprising two relatively movable members, one of said members being connected to said gas pedal, the other of said members being connected to said pivotally mounted member, and a lost motion connection between said members.

10. A rotaional speed control arrangement according to claim 9, wherein said lost motion connection includes yielding means.

References Cited in the file of this patent
UNITED STATES PATENTS 2,794,432   Nystrom _____ June 4, 1957

FOREIGN PATENTS 967,033   France _____ Mar. 22, 1950